(12) United States Patent
Riedl

(10) Patent No.: US 9,012,019 B2
(45) Date of Patent: Apr. 21, 2015

(54) DATA CARRIER CARD AND METHOD FOR MANUFACTURING A DATA CARRIER CARD

(75) Inventor: Josef Riedl, Attenkirchen (DE)

(73) Assignee: Giesecke & Devrient GmbH, Munich (DE)

( * ) Notice: Subject to any disclaimer, the term of this patent is extended or adjusted under 35 U.S.C. 154(b) by 267 days.

(21) Appl. No.: 13/515,834

(22) PCT Filed: Dec. 8, 2010

(86) PCT No.: PCT/EP2010/007464
§ 371 (c)(1),
(2), (4) Date: Jun. 14, 2012

(87) PCT Pub. No.: WO2011/072818
PCT Pub. Date: Jun. 23, 2011

(65) Prior Publication Data
US 2012/0251753 A1    Oct. 4, 2012

(30) Foreign Application Priority Data

Dec. 18, 2009 (DE) .......................... 10 2009 058 803

(51) Int. Cl.
| | |
|---|---|
| B32B 3/00 | (2006.01) |
| B32B 7/02 | (2006.01) |
| B32B 37/14 | (2006.01) |
| B32B 27/08 | (2006.01) |
| B32B 3/14 | (2006.01) |

(Continued)

(52) U.S. Cl.
CPC . *B32B 27/08* (2013.01); *B32B 3/14* (2013.01); *B32B 3/18* (2013.01); *B32B 5/142* (2013.01); *B32B 2250/24* (2013.01); *B32B 2307/41* (2013.01); *B32B 2307/412* (2013.01); *B32B 2307/414* (2013.01); *B32B 2425/00* (2013.01); *B42D 2033/30* (2013.01); *B29L 2017/006* (2013.01); *B29C 47/0021* (2013.01); *B29C 47/062* (2013.01); *B29C 47/065* (2013.01); *B42D 25/00* (2014.10); *Y10S 383/904* (2013.01)

(58) Field of Classification Search
CPC .................................................... B42D 2033/00
See application file for complete search history.

(56) References Cited

U.S. PATENT DOCUMENTS

| | | | | |
|---|---|---|---|---|
| 5,449,200 | A | * | 9/1995 | Andric et al. ................... 283/67 |
| 2004/0043203 | A1 | * | 3/2004 | Bogdanovic .................. 428/201 |

(Continued)

FOREIGN PATENT DOCUMENTS

| | | | |
|---|---|---|---|
| DE | 10 2004 013 201 A1 | 10/2005 | |
| DE | 10 2008 029 433 A1 | 12/2009 | |

(Continued)

OTHER PUBLICATIONS

International Search Report in corresponding International Application No. PCT/EP2010/007464, dated Mar. 17, 2011.

(Continued)

*Primary Examiner* — David Sample
*Assistant Examiner* — Nicole T Gugliotta
(74) *Attorney, Agent, or Firm* — Workman Nydegger

(57) ABSTRACT

A card body for a portable data carrier, in particular a chip card or magnetic strip card, and a method for manufacturing a card body. The card body includes at least a coextruded foil having at least two areas with different material properties. By using coextruded foils a card body consisting of a plurality of alternating opaque and transmissive strips as well as a card body with a window can be formed in a simple fashion.

18 Claims, 6 Drawing Sheets

(51) Int. Cl.
  *B32B 3/18*   (2006.01)
  *B32B 5/14*   (2006.01)
  *B42D 25/00*  (2014.01)
  *B29L 17/00*      (2006.01)
  *B29C 47/00*      (2006.01)
  *B29C 47/06*      (2006.01)

(56) References Cited

U.S. PATENT DOCUMENTS

2006/0249951 A1\* 11/2006 Cruikshank et al. ............ 283/92
2011/0114731 A1\*  5/2011 Riedl ........................... 235/487

FOREIGN PATENT DOCUMENTS

| | | |
|---|---|---|
| EP | 2 116 366 A1 | 11/2009 |
| GB | 2 348 394 A | 10/2000 |
| WO | WO 03/095218 A1 \* 11/2003 | ............... B41M 3/14 |
| WO | 2009/153056 A2 | 12/2009 |

OTHER PUBLICATIONS

International Preliminary report on Patentability in corresponding International Application No. PCT/EP2010/007464.

\* cited by examiner

DATA CARRIER CARD AND METHOD FOR MANUFACTURING A DATA CARRIER CARD

BACKGROUND OF THE INVENTION

A. Field Of The Invention

The invention relates to a data carrier card, in particular a chip card and/or magnetic strip card, as well as a method for manufacturing a data carrier card.

B. Related Art

Data carrier cards today are fabricated mostly from plastic foils, for example in that several foils are laminated with each other, so as to form a card body, whereby the card body as a rule is punched out from the foils and further processed subsequently, so as to provide a corresponding data storage means and/or data processing means on the card body, in particular in the form of a microchip or of a magnetic strip.

Generally plastic foils can be manufactured through extrusion methods, in which a melt stream of plastic material is molten in an extruder and pressed through a nozzle to form the foil.

In the publication print DE 102004013201 A1 a so-called coextrusion method is described, in which at least two polymeric melt streams with different composition are joined to thereby manufacture foils with areas of different material properties.

In the publication print GB 2348394 A a further method for coextrusion is described, in which a foil is formed from longitudinal strips with different colors between a lower and an upper layer.

From the unpublished German patent application DE 102008029433.0 a data carrier card is known that contains a foil having two surface areas with different material properties. The foil is manufactured by coextrusion.

In the manufacture of conventional data carrier cards there is the problem that areas with different material properties, such as e.g. regions with different color configuration, must be produced in separate processing steps, e.g. through printing technological measures, thereby making the manufacture of such data carrier cards elaborate.

SUMMARY OF THE DISCLOSURE

It is therefore the objective of the invention to specify a card body with which a portable data carrier can be manufactured that has surface areas with different material properties.

The card body according to the invention comprises one or several foils, with at least one foil being a coextruded foil having at least two areas with different material properties. The invention is based on the finding that foils manufactured by coextrusion can be used in a suitable fashion for portable data carriers so as to form areas with different material properties, in particular different surface areas. In this fashion separate processing steps for forming areas with different properties can be omitted.

In a preferred variant the card body has several foils disposed above each other, the foils being laminated with each other or being formed in total by coextrusion. Here at least one of the foils is a coextruded foil, however whereby also the complete layer arrangement can be formed by coextrusion, so that the layer arrangement in this case can also be equaled to one single coextruded foil having areas with different properties in the direction of the thickness of the foil and preferably also in the surface of the foil.

In a further embodiment of the invention the card body also has several foils disposed above each other, whereby at least a portion of the foils are formed of one material over their full surface, and are arranged on at least one side of the coextruded foil. In this fashion the stability of the card body can be increased. Here the foils formed of one material over their full surface can be transmissive or opaque foils, whereby transmissive is to be understood as both completely pervious to light, i.e. transparent, and also partly pervious to light, i.e. translucent.

In a particularly preferred embodiment the at least two areas of the coextruded foils or at least one coextruded foil are formed of different materials. Likewise the at least two areas can be formed of the same basic material with different additives. The different areas with different material properties can in particular differ in their optical properties. For example one area of the at least two areas of a coextruded foil can be opaque and at least one other area of the at least two areas of the coextruded foil can be transmissive, in particular transparent or translucent. The optical properties of the areas can also differ with regard to their polarization properties. In particular at least one area of the at least two areas can be polarizing, so that it only lets light of a predetermined polarization pass. In this fashion different optical effects can be produced in the card body in a particularly simple way.

In a particularly preferred embodiment of the card body according to the invention at least one area of the at least two surface areas of the at least one coextruded foil is formed of a more elastic and/or more hard-wearing material than at least one other surface area of the at least two surface areas of the coextruded foil. When the data carrier card for example is used later on in an electronic identification book for identifying a person, in particular an area disposed at the seam of the later identification book of the or of at least one coextruded foil is more elastic than an area of the coextruded foil that is not disposed at the seam of the later identification book. In this fashion a high stability of the identification book is ensured in a area in which the relevant identification data are preferably disposed (e.g. at a distance from the seam), whereby at the same time a good handling of the identification book when turning pages is ensured through the elastic area at the seam.

The different areas of the or of at least one coextruded foil can be formed of any desired plastics. Preferably for this purpose one or several of the following materials are used: polycarbonate, PET (PET=polyethylene terephthalate), PETG (PETG=polyethylene terephthalate-glycol), TPE (TPE=thermoplastic elastomer), TPU (TPU=thermoplastic elastomer on urethane basis), polyolefins, PA (PA=polyamide), PVC (PVC=polyvinyl chloride), ABS (ABS=acrylonitrile-butadiene-styrol-copolymer).

In the card body according to the invention further the transitions between two adjacent areas of the or of at least one coextruded foil can be configured as desired, in particular sharp and/or also smooth, whereby the properties of the transition can also change along a transition.

In a particularly preferred embodiment of the card body according to the invention one or several coextruded foils with respectively at least an opaque area and at least a transmissive area are configured and/or arranged above each other in such a fashion that the card body has at least a transmissive window and/or at least a transmissive window strip. Thereby a window area can be formed in a simple fashion without further processing steps. The window or the window strip therein can extend throughout the complete card body, but also windows or window strips are conceivable that do not extend throughout the complete thickness of the card body, but end at an opaque area of a foil.

In a further embodiment of the invention the coextruded foil or at least one coextruded foil comprises a plurality of alternating strips, for example longitudinal strips, with different magnetic properties. In particular in the coextruded foil opaque strips can alternate with transmissive strips.

In a further embodiment of the card body according to the invention, at least a portion of coextruded foils disposed above each other and having alternating opaque and transmissive strips are arranged in such a fashion that through the arrangement the at least one window and/or the at least one window strip is formed. For example at least a portion of coextruded foils with alternating opaque and transmissive strips disposed above each other can be arranged in such a fashion that opaque and transmissive strips of adjacent foils are disposed respectively above each other. This means that the opaque strip of a foil is disposed exactly on or under the opaque strip of a different, adjacent foil and the same is valid for the transmissive strips. Likewise at least a portion of coextruded foils disposed above each other can be arranged in such a fashion that opaque and transmissive strips of adjacent foils are arranged at an offset and/or rotated in relation to each other, in particular rotated by an angle of 90°. Thereby preferably limited windows are formed within the surface of the foil.

The thickness of the card body is between 30 μm and 900 μm in a preferred variant of the invention. Thereby a sufficient stability of the card body is ensured. In a further embodiment of the card body according to the invention the or at least one coextruded foil is printed or equipped with a lacquering at least on one side. In this fashion further optical effects can be produced.

Besides the above-described card body the invention also comprises a method for manufacturing such a card body, whereby the card body is formed by coextrusion of at least one foil in such a fashion that the at least one foil has at least two areas with different material properties. The coextrusion therein takes place in particular with a multilayer nozzle of a coextrusion arrangement and preferably at a temperature of essentially 230° C. and more, in particular at 250° C. In a further variant one or several further foils are applied on at least one side of the coextruded foil through laminating, so that a multilayer card body can be formed. The manufacturing method usually comprises further steps, in particular the punching out of the card body from the coextruded foil or from the multilayer layer structure of coextruded foil and further foils, the application of a chip and/or of a magnetic strip and the like.

DESCRIPTION OF THE DRAWINGS

Embodiments of the invention will be described in detail subsequently with reference to the enclosed figures.

The figures are described as follows:

FIG. 4 to FIG. 6b four different embodiments of methods for manufacturing the respective foil according to FIG. 1 to;

DETAILED DESCRIPTION OF PREFERRED EMBODIMENTS

Figure 1:
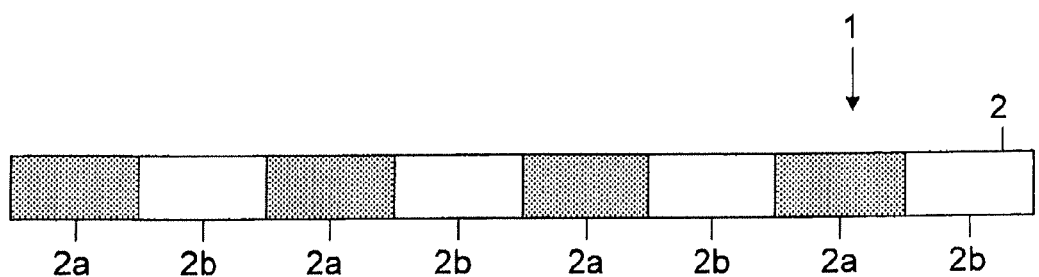
FIG. 1 to FIG. 3 cross-sectional views of three different embodiments of a foil for constructing a card body.

FIG. 1 shows schematically in cross section a first embodiment of a coextruded foil 2 for manufacturing a card body. A card body here is understood as both a complete card body and a card-body layer or a foil structure that becomes a finished card body only in combination with further layers. The card body itself serves for example to manufacture a portable data carrier in credit card format. For this purpose as a rule further processing steps are carried out on individual card body layers and/or on the finished card body. For example in or on a card-body layer before bonding with further card body layers a transponder arrangement can be formed or the finished card body can be equipped with an optical individualization. Card bodies can furthermore be manufactured in highly different geometries for a multiplicity of other purposes, for example for use as a data page in a passport book, for use as a token for authentications or for incorporation into such a token or for manufacture of a memory card for portable electronic devices.

Figure 2:
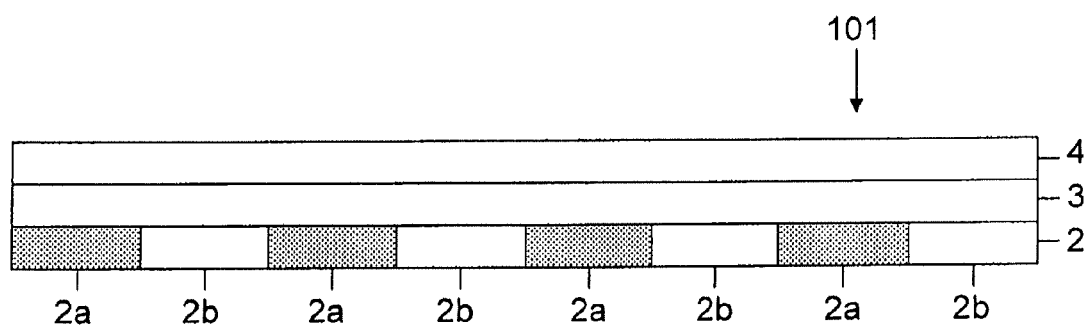

In the simplest case indicated in FIG. 1 the card body has a single-layer structure and consists of only one single foil 2. This foil 2 is manufactured by a coextrusion method, in which several melt streams coming from different extruders are joined in a multilayer nozzle, so that in the emerging foil 2 different surface areas are formed out of the different melt streams. The melt streams therein differ regarding their material properties. In the embodiment according to FIG. 1 a foil 2 with a plurality of surface areas in the form of alternating longitudinal strips 2a and 2b is formed through the multilayer nozzle, whereby the strips 2a and 2b respectively belong to the same melt stream of a corresponding extruder. The melt stream from which the strips 2a emerge therein is based on an opaque polymer material, which is indicated by the dotted cross section in FIG. 1 and all further figures. Between two opaque strips 2a a strip 2b is disposed that comes from a melt stream of a transmissive polymer; for the transmissive polymer partly simply a transparent material is presumed in the following, so as to facilitate understanding, without excluding translucent materials. The strips 2a and 2b, as indicated in FIG. 2, can have the same width or different widths. Regarding the geometric size of the widths only the limits set by the respectively used extrusion apparatus are given. For manufacturing card bodies in credit card format typical strip widths are between 3 and 70 mm, but narrower or broader strips are readily possible. The thickness of a foil 2 typically amounts to 30 to 900 μm. Instead of an opaque and a transmissive material there can also be employed polymer materials that differ from each other in a different fashion, such as materials in different colors or two differently transmissive materials or a material with an additive and a basically identical material without an additive.

Figure 4:
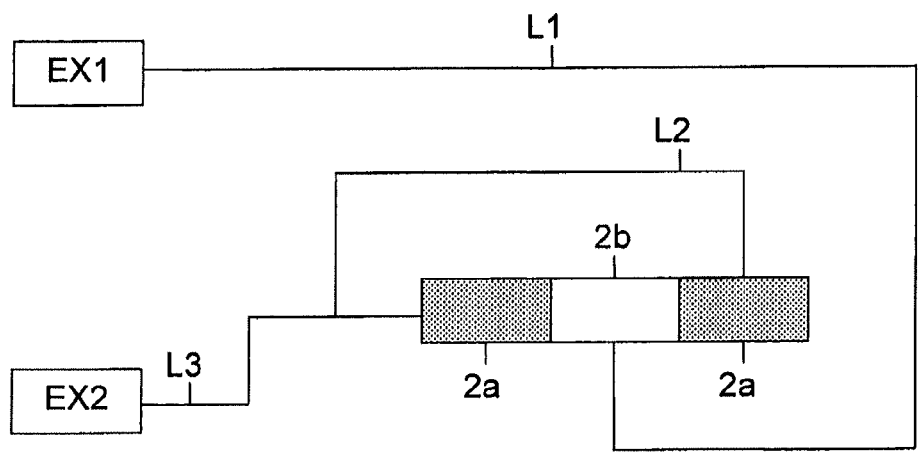

FIG. 4 shows schematically a corresponding coextrusion arrangement for forming the card body according to FIG. 1. Through the extruder EX1 a melt stream for forming the transparent strips 2b is produced, as indicated by a corresponding line L1. Further by the extruder EX2 a melt stream for forming the opaque strips 2a is generated, as indicated by corresponding lines L2 and L3. The forming of the adjoining strips takes place with the aid of a (not shown) multilayer nozzle with corresponding nozzle openings and inlets for the melt streams for forming the adjacent strips 2a or 2b. For reasons of clarity in FIG. 4 only three adjacent strips 2 are shown, whereby the foil cross section according to FIG. 1 is produced through multiple repetitions of alternating adjacent strips 2a and 2b.

Coextrusion methods are generally known, for which reason a detailed description of such methods and corresponding parallel multi-nozzle extrusion apparatus for carrying out such methods is omitted. Nevertheless the use of coextrusion methods for producing foils having surface areas with different material properties for card bodies has so far not been known. The coextrusion takes place preferably at the temperature of the melt streams of approximately 250° C. Thereby a homogeneous foil emerges without any noticeable mechanical weak points or rated breaking points.

FIG. 2 shows a second embodiment of a card body 101 that was constructed in three layers using a coextruded foil 2. The card body 101, analogously to FIG. 1, has a first layer of a coextruded foil 2 that can be manufactured in the same fashion as the foil of FIG. 1. In contrast to the card body 1 of FIG. 1 now two further layers of foils 3 or 4 are arranged above the foil 2, whereby the foils 3 and 4 in the embodiment of FIG. 2 are transparent and consist of the same polymer material over their full surface. The foils 3 and 4 are manufactured preferably also through extrusion, preferably through common extrusion with the foil 2. Alternatively the foils 3 and 4 can also be fabricated separately and laminated on the foil 2 subsequently. The use of further foils 3 and 4 increases the stability of the card body 101. The individual foils 3, 4 can in addition have different formulation components, e.g. laser additives, security features, optical features and the like.

Figure 5:
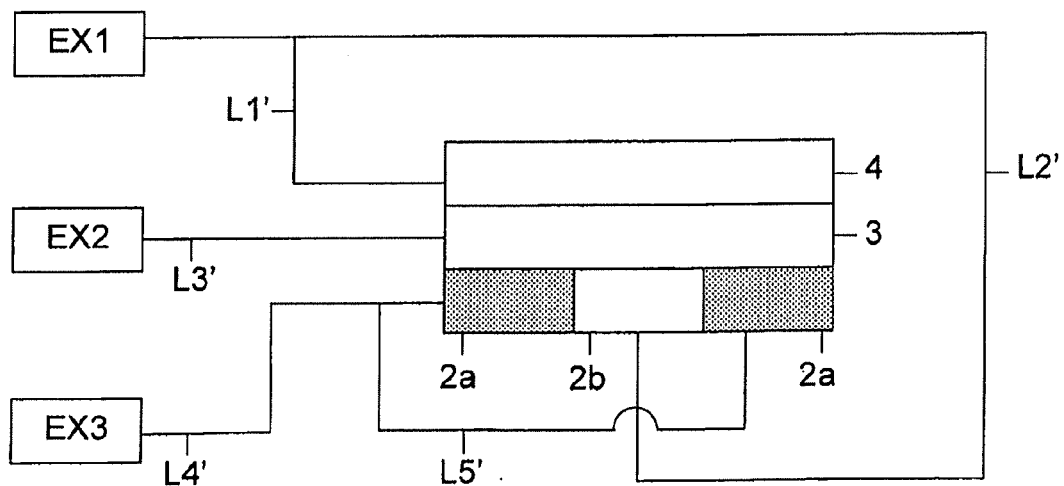

The foil structure according to FIG. 2 is preferably formed in one single coextrusion step with a correspondingly configured and controlled multilayer nozzle. A corresponding coextrusion arrangement for carrying out such a coextrusion is indicated schematically in FIG. 5. Now three extruders EX1, EX2, and EX3 are used. The extruder EX1 produces the melt stream of the uppermost layer 4 as well as the melt streams of the transparent strips 2b, as indicated by the lines L1' and L2'. By the extruder EX2 the melt stream for the center transparent foil 3 is generated (line L3'). In contrast the extruder EX3 produces the opaque melt stream of the corresponding opaque strips 2a, as reproduced by lines L4' and L5'. For the sake of clarity only three of the strips of foil 2 are reproduced. The formation of the melt stream for the uppermost foil 4 according to the line L1' is optional and might be omitted, causing only one single additional foil 3 to be formed on the foil 2. According to FIG. 5 a coextrusion method is realized which produces different melt streams not only in planar fashion in horizontal direction, but also in the direction of the thickness of the layer structure. The coextrusion thus also comprises the simultaneous production of several different foil layers. By means of the foil structure illustrated in FIG. 2 card bodies 101 can be manufactured in a particularly simple fashion that have one or several transparent strips extending from the one edge to the other edge. The transparent strips here can readily also be disposed at the edges of the card body 101. To construct such a card body 101 the foil structure represented in FIG. 2 can be coated in a simple fashion on one or both sides with further transparent layers, so that the predetermined thickness is reached. Alternatively several similar foil structures as represented in FIG. 2 can be placed on top of each other.

Figure 3:
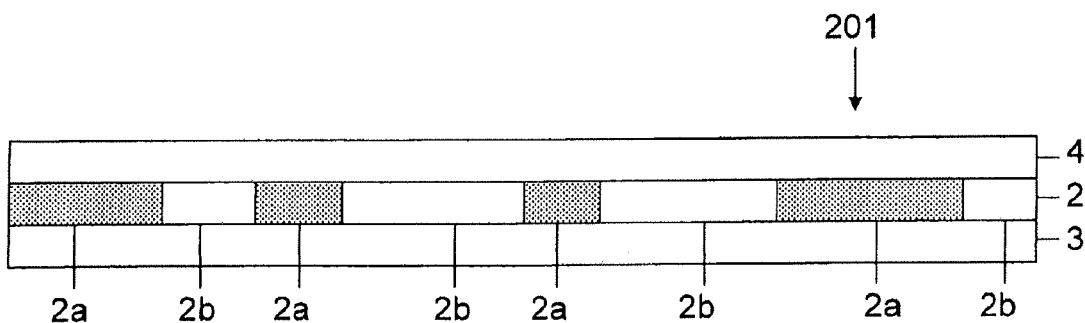

FIG. 3 shows in a cross-sectional view a third embodiment of a card body according to the invention. The card body 201 of FIG. 3 here is again constructed as a multilayer foil structure and essentially corresponds to the card body 101 of FIG. 2. However, now the opaque and the transmissive strips 2a, 2b have varying widths. Further the foil 2 with the strips 2a and 2b is arranged between the two foils 3 and 4 that are transparent all over. Also by this structure an increased mechanical stability of the card body is achieved. Analogously to FIG. 2 the foils 3 and 4 can be fabricated separately, in particular by extrusion, and can subsequently be laminated on the coextruded foil 2.

Figure 6A:
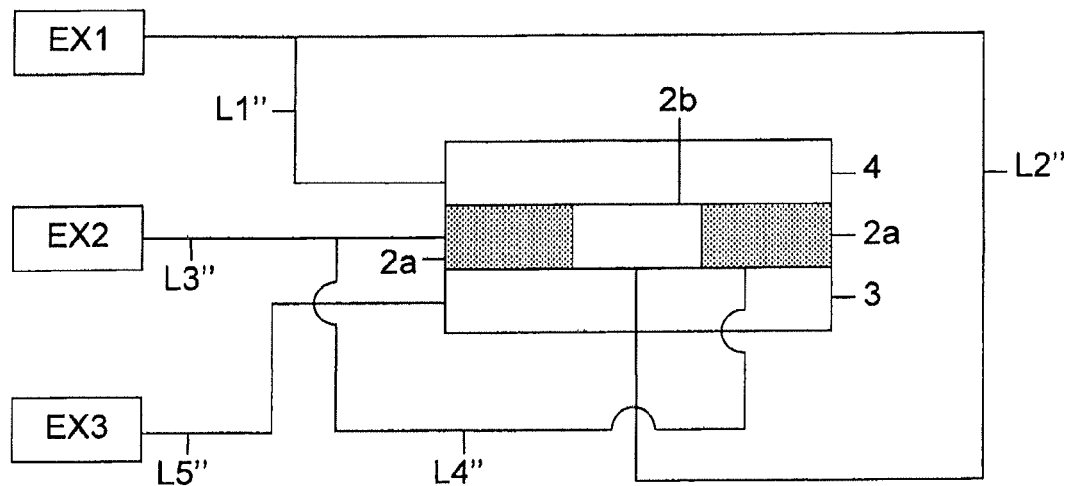
Figure 6B:
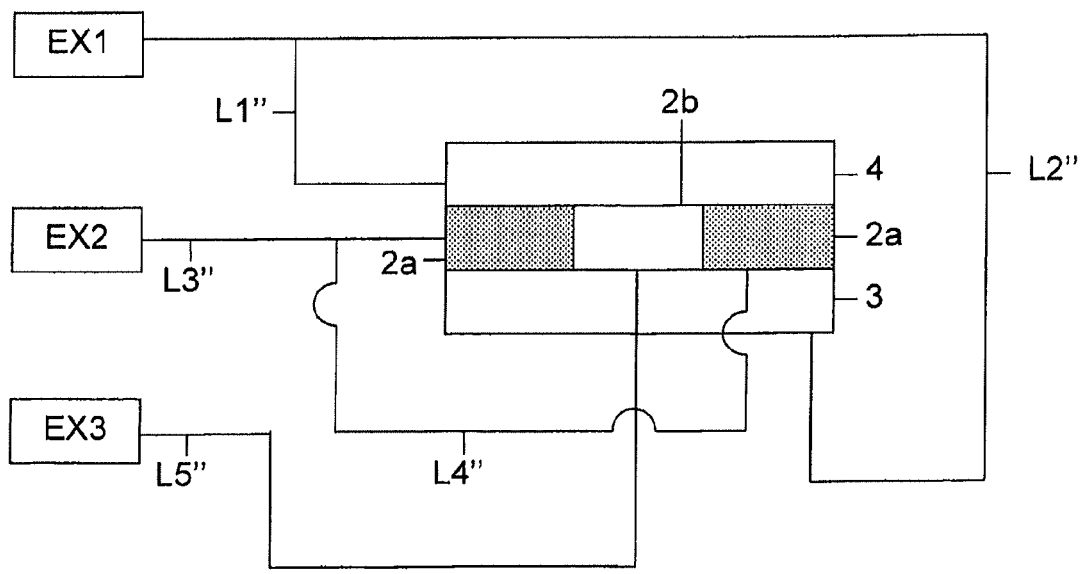

Preferably the foil structure according to FIG. 3 is again produced in a single coextrusion step. An extrusion arrangement provided for this purpose is represented schematically in FIGS. 6a and 6b. The arrangement of FIG. 6a corresponds largely to the arrangement according to FIG. 5. Via an extruder EX1 the melt stream for forming the upper foil layer 4 and the transparent strips 2b of the foil 2 is produced, as indicated by lines L1'' and L2''. The extruder EX2 generates the melt stream of the opaque layers 2a of the foil 2 (lines L3'' and L4''). In contrast to the arrangement of FIG. 5 now by the extruder EX3 a lower melt stream is produced below the foil 2 to form the foil 3, as indicated by the line L5'. The production of the different foil areas in vertical and in horizontal direction therein takes place again through a correspondingly configured and controlled multilayer nozzle with a multiplicity of nozzle openings. The arrangement shown in FIG. 6b differs from FIG. 6a in that the melt stream supplied by the extruder EX1 now serves to produce the foil layers 3 and 4, as indicated by L2'', and the melt stream supplied by the extruder EX3 serves to produce the transparent strips 2b, as indicated by L5''.

Card bodies that are manufactured with foils according FIG. 1 to FIG. 3 produced according to the above-described method have typical thicknesses of 680 μm to 840 μm, whereby, depending on the application case, thicker or thinner foils can be chosen and the thicknesses of the respective foil layers in a card body can also differ from each other.

Figure 8A:
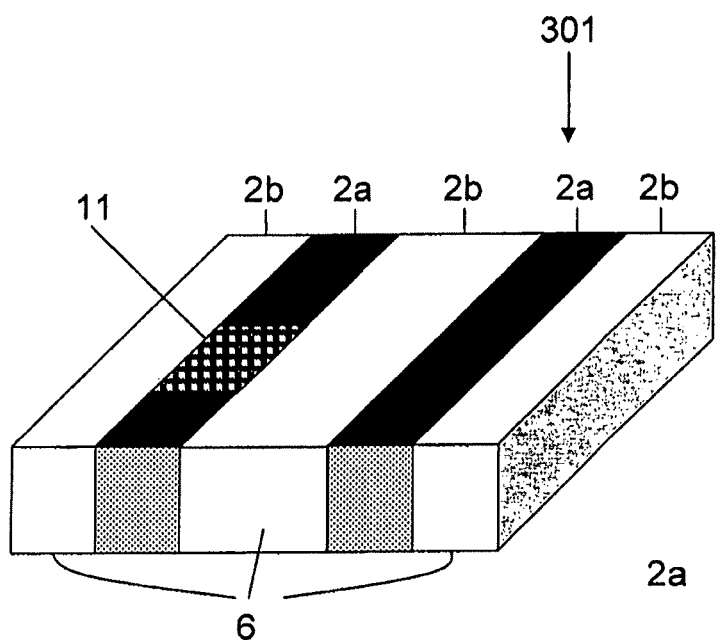
FIG. 8a, FIG. 8b and FIG. 9 perspective views of two further embodiments of card-body structures.
Figure 8B:
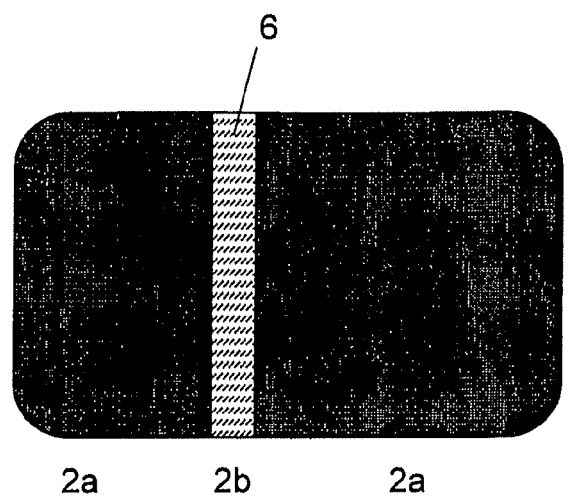

By means of the foils or foil structures illustrated in FIG. 1 to FIG. 3 card bodies 1, 101, 201 can be manufactured in a particularly simple fashion, said card bodies having one or several transparent strips 2b extending from one lateral edge to an opposite lateral edge; a thus configured card body is illustrated in FIG. 8b in a top view. The transparent strips 2a therein can readily also be disposed at the edges of the card body 101, 201. The transparent strip can also be configured very narrow on the model of banknotes, as a narrow security strip, and be equipped with additional security features. To construct such a card body 101, 201 a foil structure represented in FIG. 1 to FIG. 3 can be coated readily with further transparent layers on one or both sides, so that the predetermined thickness is reached. Alternatively several similar foil structures as represented in FIG. 1 to FIG. 3 can be placed above each other. Further of course simply a mono foil of the thickness of the finished card with the desired strip arrangement can be manufactured.

By using card body foils manufactured in accordance with the invention on the basis of coextrusion, different variants of differently configured card bodies can be formed in a simple fashion. In particular with corresponding additives in the individual different melt streams of the extruders different locally limited effects can be produced in the card bodies, such as e.g. light effects, color shift effects and the like. Further light effects can be achieved by corresponding printing of the foils. The individual materials of which the strips 2a, 2b of the foil 2 according to FIG. 1 to FIG. 3 consist can be based on the same basic material, however whereby different additives are added for the strips 2a and 2b. Likewise completely different polymer materials can be used for the individual strips 2a and 2b. Also the foils 3 and 4 according to FIG. 2 and FIG. 3 can, if required, consist of different materials or of materials with different additives.

With the aid of the coextrusion method according to the invention for example card bodies for an electronic passport document can be manufactured. The card body here is formed of a material that is flexible in the seam area of the passport, so as to ensure that the passport document can readily be leafed through. In contrast the area of the card body on which there are disposed the person-related data of the passport is formed by a material having a certain stiffness, so as to increase thereby the stability of the document. Likewise, in the case of cards with bending axes, with the aid of coextrusion the areas along the bending axis can be manufactured of a more hard-wearing material than the other areas. Those material areas that are not disposed along the bending axis, and consequently must have a lower resistance, can be manufactured of a cheaper, less stable material. In this fashion the costs of manufacturing the card body are decreased.

As explained above, the individual strips 2a or 2b of foil 2 according to FIG. 1 to 3 can be formed of the same polymer basic material with different additives. For example for the opaque areas 2a corresponding dyes can be added. Likewise the transparent areas 2b can be configured not completely transparent, but only partly transmissive, i.e. translucent, whereby these areas can, if required, also be colored or pigmented. Likewise the individual strips can have polarizing properties. If required, the strips 2a and 2b can also consist of different polymer materials. Particularly preferably as plastic materials for the individual strips of the foil 2 or also for the foils 3 and 4 the following plastics come into question on their own or in combination: polycarbonate, PET, PETG, TPE, TPU, polyolefins, PA, PVC and ABS.

Further effects can be achieved in that the corresponding transitions between the different materials are configured suitably in dependence of the application case, e.g. smooth or sharp. The foils 3 and 4 according to the embodiments of FIG. 2 and FIG. 3 can be colored, if required, so as to e.g. produce translucent applications or produce colored graduations in transmission.

Figure 7:
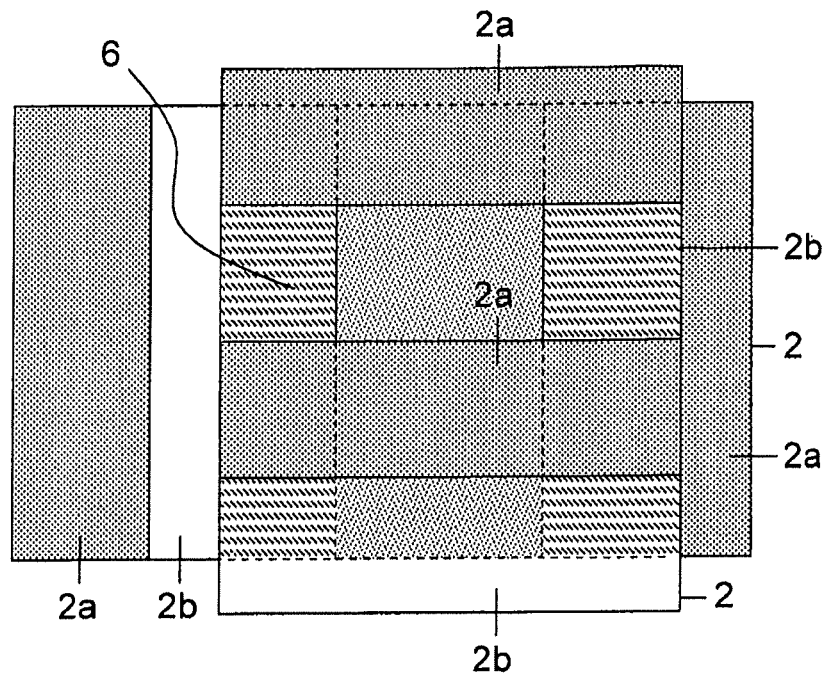
FIG. 7 a schematic view of the arrangement of two foils disposed above each other in the manufacture of a card body according to a further embodiment of the invention.

In a particularly preferred embodiment of the invention card bodies are constructed from a plurality of coextruded foil structures with different surface areas. This is indicated in the embodiment according to FIG. 7, whereby in this example two similar coextruded foil structures with alternating opaque and transparent strips 2a, 2b are arranged above each other. The individual coextruded foil structures here correspond, regarding their structure, to a coextruded foil structure according to FIG. 1 to 3. By offsetting or rotating the foil structures in relation to each other card bodies with transparent windows can be produced. According to FIG. 7 such transparent windows 6 result from a rotation of the strips of the lower foil structure by 90° in relation to the strips of the upper foil structure. In the overlapping areas between the transparent strips 2b of the lower and of the upper foil structure the complete structure is transparent and windows result. The construction principle is not limited to two foil structures or an orthogonal orientation of the foil structures placed above each other. Rather, more than two foil structures can be applied above each other, whereby the width of the transparent strips 2b can vary from foil to foil. By suitably placing several foil structures above each other thereby a card body with areas of different opacity can be made. For example a window, i.e. a transparent area, can be produced that is flanked by semitransparent areas. By suitably placing semi-transparent colored foil structures above each other different graduations of the color can be produced.

Figure 10:
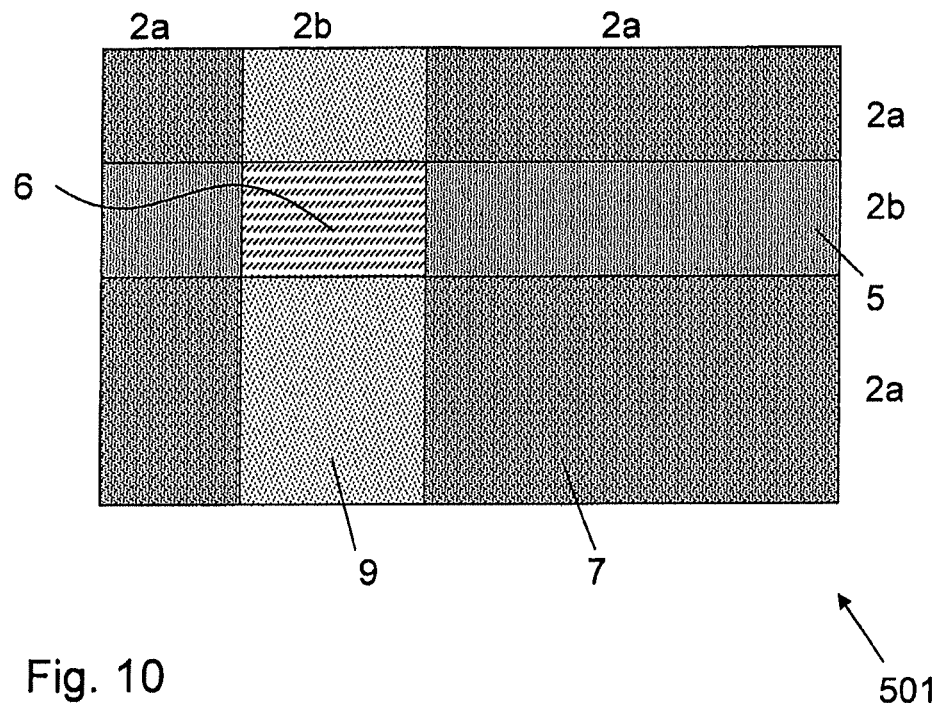
FIG. 10 a top view of a card body constructed through orthogonal superimposition of two foils.

FIG. 10 shows a card body 501 constructed by orthogonally placing above each other two foil structures with strips 2a, 2b of different widths, whereby the opacity of the two opaque strips does not have to be the same. The resulting card body 501 has a window area 6 in which the transmissive strips 2b of the foil structures are superimposed, four areas 7 with the highest opacity, in which respectively opaque strips are superimposed, two areas 8 with medium opacity, in which respectively one transmissive strip 2b and one strip 2a of higher opacity are superimposed, as well as two areas 9 of low opacity, in which respectively one transmissive strip 2b and a strip 2a of low opacity are superimposed.

The construction of a card body or of a partial layer of a card body from a foil structure can also take place using one single continuous foil structure that is folded on top of itself instead of several separate foil structures. For example the construction shown in FIG. 7 could take place by folding one single elongated foil structure.

The foil structures can be equipped with similar or individual graphic elements before bonding them to form a card body. For example a design print and/or alphanumeric characters can be applied on one or several foil structures. These can be consistent or also different in all foil structures. The characters and the print can be designed so that a special effect results from placing several printed foil structures above each other. Further the foil structures can individually or all be equipped with physically effective materials, whereby it can again be provided that only the superimposition leads to an intended effect.

For example in this fashion by superimposing in exact register two or more foil structures that respectively show a portion of or a color forming part of a graphic element, a register effect can be produced in a very simple fashion, showing a graphic element that is comprehensively recognizable only in transmission or only in incident light from a certain side.

Figure 11:
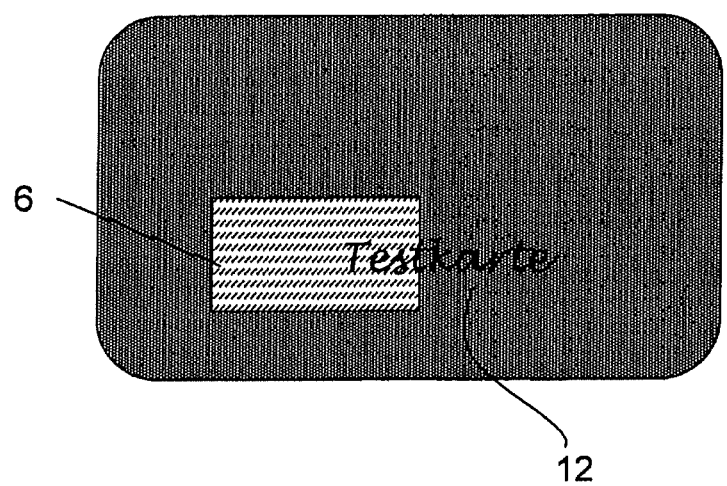
FIG. 11 a top view of a card body constructed of several foils, whereby a foil disposed inside bears an alphanumeric information.

In a different embodiment indicated in FIG. 11 a transparent foil structure that is disposed on the inside of the card body and that can also be a foil structure in accordance with FIG. 2 or FIG. 3, was equipped with alphanumerical characters in the form of a writing and subsequently bonded with one or several coextruded foil structures according to FIG. 1 to FIG. 3, so that a window 6 results. The non-transmissive areas of the coextruded foil structure therein are semi-transparent or at least translucent against a backlight. The writing 12 is placed so that it is disposed partly in the window 6 and partly in the non-transparent area of the card body. Therein it is continued beyond the edge of the window 6 without any interruption and is therefore suitable as an easy to manufacture security feature.

In a further embodiment the core of a card body is formed by means of a coextruded foil structure according to FIG. 8a and said core is covered on both sides with two opaque cover foils. Thus a card body results which shows a clearly recognizable color structure and/or material structure at least on two longitudinal sides, without a special coloring or processing of the lateral edges of the card body being necessary. Likewise a window 6 can easily be manufactured whose inner frame bears a striped coloration. A transparent strip 2b can be used here to conduct light guided in from the side of a card body to a window or also the opposite side.

If required, the surface of the card body can be printed in partial areas. FIG. 8a shows the structure of a card body 301 with a print. The card body 301 comprises a plurality of (not individually shown) foil structures with superimposed opaque and transparent areas. Opaque strips 2a extending through the complete thickness of the card body 301 result therefrom, as well as windows 6 that extend through the complete thickness of the card body and are formed by transparent strips 2b. The card body 301 is equipped with a print 11 that is applied in the embodiment of FIG. 8 in the opaque area 2a. The print 11, if required, can also be configured in such a fashion that it is disposed only in the transparent or in the transparent and the opaque area of the card body 301. In particular the print can be configured so that corresponding window areas of predetermined size emerge on the transparent strips. FIG. 8b shows a card body with a strip-shaped window 6 extending from one lateral edge to an opposite lateral edge.

Figure 9:
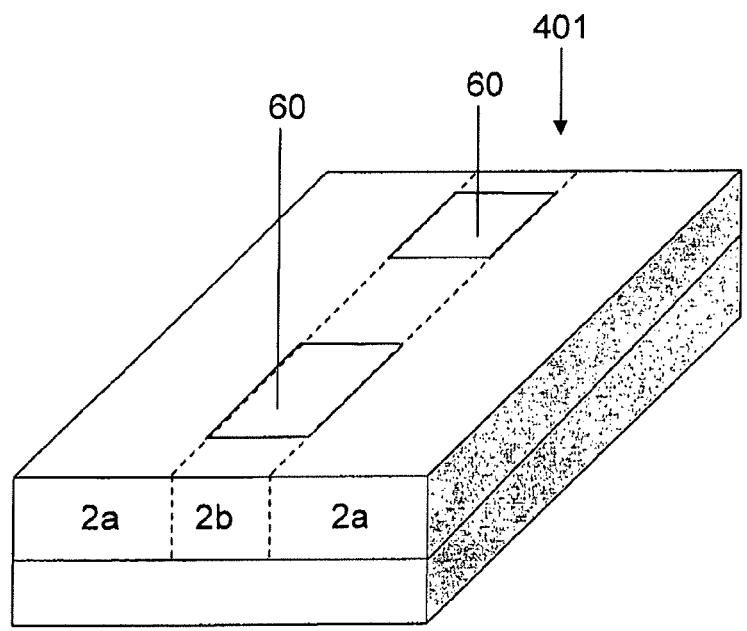

FIG. 9 shows a further embodiment of a card body 401 according to the invention, in which window areas 60 are formed towards an upper side, said window areas extending only partly into the card body and not therethrough. Such non-through opening, enclosed window areas 60 are particularly advantageous when a card body 401 is to be equipped with a lenticular grid later on, such as an MLI (multiple laser image) or a CLI (changeable laser image). Since the formation of MLI or CLI structures requires a minimum strength of underlying, transparent material that corresponds to the desired structure radii, through forming windows 60, as shown in FIG. 9, a greater layer thickness can be provided for accommodating an MLI or a CLI than is the case when, as usual, there is only a thin transparent cover foil available for the MLI/CLI. This in turn allows the design of an MLI or CLI with greater lenticular radii, thereby facilitating the manufacture of the MLIs or CLIs. A card body as shown in FIG. 9 can for example be produced through a multilayer structure according to FIG. 7. The generation of window areas 60 of different size therein can for example be achieved by varying the width of the transparent or opaque strips of the foil structure.

As indicated by the above statements, through the use of coextruded foil structures for card bodies many different variants of portable data carriers regarding optics and material properties can be realized in a simple fashion.

The invention claimed is:

1. A card body, comprising:
    at least two coextruded foils each comprising an opaque portion having high opacity and a transmissive portion having low opacity,
    said foils being disposed with respect to each other so that in at least a first area of the card body the transmissive portion of one of the foils overlap to form a window and in adjoining second area of the card body the transmissive portion of one of the foils and the opaque portion of a separate one of the foils overlap such that outside the first area, the card body has a graduated opacity.

2. The card body according to claim 1, wherein at least one of the transmissive portions is transparent.

3. The card body according to claim 1, wherein each foil is formed by coextrusion and defines a foil structure, so that the foil structure comprises a uniform material and has only one surface area.

4. The card body according to claim 1, wherein the transmissive portion of one or more of the foils includes graphic elements.

5. The card body according to claim 1, wherein the transmissive portions of overlapping foils each include graphic elements which are adjustable so that an optically perceivable interaction results between the overlapping foils.

6. The card body according to claim 1, wherein a first portion of a first foil includes graphic elements, and the first area is disposed partly below a transmissive portion of a second foil disposed above the first foil, and partly below a second portion of the second foil, said second portion being translucent or being opaque and translucent only against a backlight.

7. The card body according to claim 1, wherein one or more of the coextruded foils is covered on both sides with opaque cover foils, so that the card body displays a clearly recognizable material structure at least on two lateral sides.

8. A portable data carrier comprising the card body recited in claim 1.

9. A method for manufacturing a card body for a portable data carrier, comprising:
    coextruding at least two foils each formed of at least two different polymer materials and each foil comprising an opaque portion having higher opacity and a transmissive portion having lower opacity;
    arranging said foils with respect to each other to form the card body, the foils being arranged such that:
        in a first area of the card body the transmissive portions of the foils overlap to form a window,
        outside the first area the transmissive portions of the foils and the opaque portions of the foils overlap in a manner such that the card body has a graduated opacity.

10. The method according to claim 9, wherein the foils manufactured by coextrusion are formed respectively of two layers of foils, wherein the first foil layer is formed of two different polymer materials and the second foil layer is formed of a single polymer material over its full surface, said polymer material of the second foil layer being formed of the same polymer material and having the same material property as one of the surface areas of the first foil layer.

11. A card body of a portable data carrier, comprising:
    a first coextruded foil comprising a first opaque portion and a first transmissive portion, the first opaque portion and the first transmissive portion each having an opacity, the opacity of the first opaque portion being relatively higher than the opacity of the first transmissive portion; and
    a second coextruded foil secured to the first foil, the second foil comprising a second opaque portion and a second transmissive portion, the second opaque portion and the second transmissive portion each having an opacity, the opacity of the second opaque portion being relatively higher than the opacity of the second transmissive portion,
    the first and second foils being positioned with respect to each other such that:
        the second transmissive portion and the first transmissive portion overlap to form a window of the card body having relatively low opacity,
        outside of the window, the first transmissive and opaque portions overlap the second transmissive and opaque portions such that the card body has a graduated opacity.

12. The card body according to claim 11, wherein one or both of the first transmissive portion and the second transmissive portion is transparent.

13. The card body according to claim 11 wherein one or both of the first foil and the second foil includes graphic elements thereon.

14. The card body according to claim 11 wherein overlapping portions of the first and second foils each includes graphic elements thereon that produce an optically perceivable interaction.

15. The card body according to claim 11 wherein the second foil includes a graphic element thereon, and wherein the first foil is positioned above the second foil such that first and second portions of the graphic element are respectively positioned below the transmissive and opaque portions of the first foil, and wherein the second portion of the graphic element is viewable against a backlight.

16. A method for manufacturing a card body for a portable data carrier, the method comprising:
- coextruding a first foil formed of at least two different polymer materials, the first foil being comprised of a first opaque portion and a first transmissive portion, the first opaque portion and the first transmissive portion each having an opacity, the opacity of the first opaque portion being relatively higher than the opacity of the first transmissive portion;
- coextruding a second foil formed of at least two different polymer materials, the second foil being comprised of a second opaque portion and a second transmissive portion, the second opaque portion and the second transmissive portion each having an opacity, the opacity of the second opaque portion being relatively higher than the opacity of the second transmissive portion;
- forming the card body from the first and second foils, the first and second foils of the formed card body being positioned with respect to each other such that:
  - the second transmissive portion and the first transmissive portion overlap to form a window of the card body having relatively low opacity,
  - outside of the window, the first transmissive and opaque portions overlap the second transmissive and opaque portions such that the card body has a graduated opacity.

17. The method according to claim 16 wherein overlapping portions of the first and second foils each includes graphic elements thereon that produce an optically perceivable interaction.

18. The method according to claim 16 wherein the second foil includes a graphic element thereon, and wherein the first foil is positioned above the second foil such that first and second portions of the graphic element are respectively positioned below the transmissive and opaque portions of the first foil, and wherein the second portion of the graphic element is viewable against a backlight.

* * * * *